June 17, 1930.  H. F. DYCK  1,765,139
COMBINATION STOP AND DRAIN COCK
Filed March 3, 1927
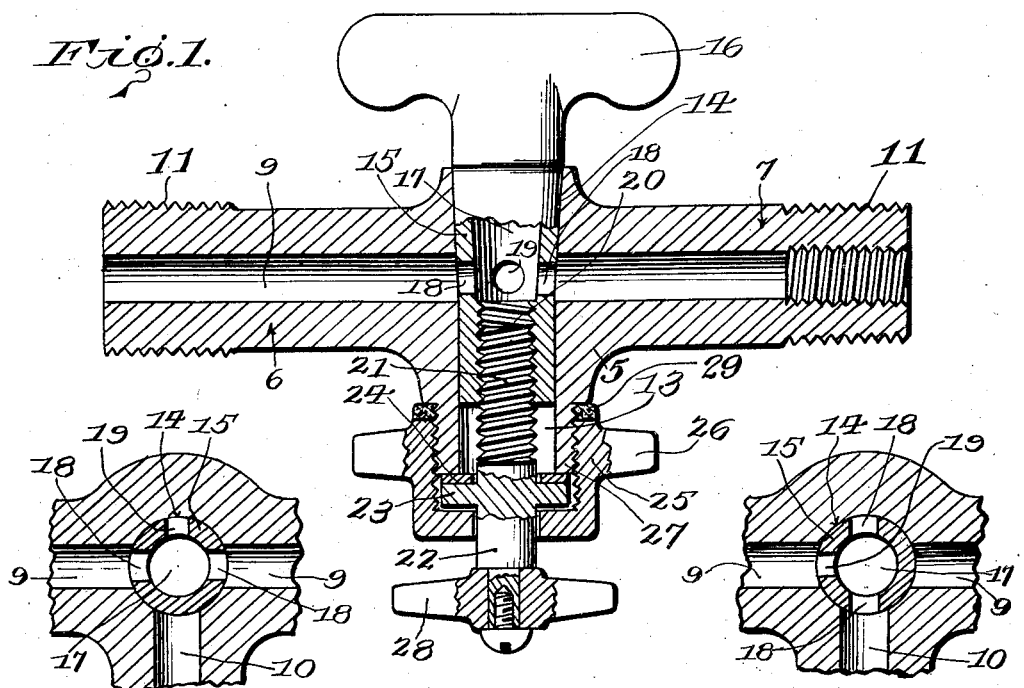
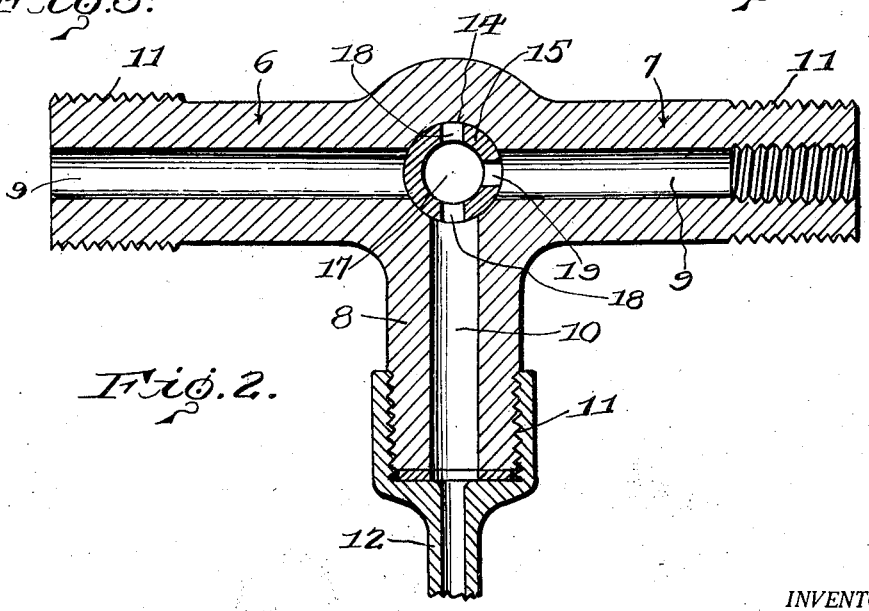
INVENTOR.
Herbert F. Dyck.
BY
Geo. F. Kimmel ATTORNEY.

Patented June 17, 1930

1,765,139

UNITED STATES PATENT OFFICE

HERBERT F. DYCK, OF NESS CITY, KANSAS

COMBINATION STOP AND DRAIN COCK

Application filed March 3, 1927. Serial No. 172,374.

The invention relates to a combination stop and drain cock and has for its primary object the provision of a device of this character, wherein liquid, for example gasoline, can be controlled from a tank to a carbureter, when the cock is used in the fuel system of an automobile, the cock being of novel form to render the same leak-proof and to permit it to be retained in adjusted position, either for draining purposes or to allow full flow of the gasoline from one point to another or to shut off such flow.

Another object of the invention is the provision of a cock of this character, wherein the valve is of the rotary type and can be retained in adjusted position so as to regulate the flow of liquid or the draining thereof from the supply line, without liability of leakage of the cock as the same is rendered leak-proof.

A further object of the invention is the provision of a cock of this character, wherein the parts thereof, including the rotary valve and the means for retaining the valve are of novel form and assembled in an unique manner, so that the said valve can be firmly held in adjusted position.

A still further object of the invention is the provision of a cock of this character, which is extremely simple in construction, thoroughly reliable and efficient in its purpose, strong, durable and inexpensive to manufacture and install.

With these and other objects in view, the invention consists in the features of construction, combination and arrangement of parts, as will be hereinafter more fully described in detail, illustrated in the accompanying drawing, showing the preferred embodiment of the invention, and pointed out in the claims hereunto appended.

In the accompanying drawing:

Figure 1 is a fragmentary vertical sectional view through the combination stop and drain cock, constructed in accordance with the invention.

Figure 2 is a horizontal sectional view showing the valve adjusted for draining purposes.

Figure 3 is a fragmentary view similar to Figure 2 showing the valve adjusted to permit full flow of liquid through the cock and the drain shutoff.

Figure 4 is a view similar to Figure 3 showing the valve further adjusted for shutting off the supply of liquid through the cock.

Similar reference characters indicate corresponding parts throughout the several views in the drawing.

Referring to the drawing in detail the combination stop and drain cock comprises a housing or shell 5 having integral therewith diametrically disposed lengthwise aligning, nipple extensions 6, 7. Formed integrally with the housing or shell 5 intermediate the ends thereof and disposed at right angles to the nipple extensions 6, 7 is a drain nipple extension 8. The bores 9 of the extensions 6, 7 are of like diameter and the bore 10 of extension 8 corresponds in diameter to that of the bores 9. The bores 9 and 10 open at the outer ends of the extensions. Each extension 6, 7 and 8 has peripheral threads 11 at the outer end portion thereof. The threaded ends of the extensions 6 and 7 are provided for coupling a fluid line therewith. The threaded end of extension 8 is provided for coupling a spout 12 therewith. The fluid line is not shown.

The housing or shell 5 provides a valve chamber 13 which is open at the top and bottom thereof. The wall of the chamber 13 has the upper portion thereof inwardly tapered, as at 14, and its lower portion is of uniform diameter. The tapered portion 14 of the chamber 13 merges into the portion of uniform diameter at a point below the plane of the bores 9 and 10. The bores 9 and 10 open at their inner ends into the valve chamber 13.

Rotatably fitted within the chamber 13 in the housing or shell 5 is a correspondingly shaped hollow turn valve or plug 15, which is formed at its upper end with a winged head 16 and the hollow 17 in said plug 15 at its upper end is closed by the head 16, while the lower end opens through the lower extremity of said plug 15 centrally thereof.

Formed in diametrically opposite points of the plug 15 are aligning openings 18 which are adapted to register with the bores 9 in the nipple extensions 6 and 7 to effect communication between these nipple extensions 6 and 7, when the plug 15 is adjusted to one position, namely that shown in Figure 3 of the drawing so that full flow of liquid will be had through the cock as will be apparent.

At right angles to these openings 18 in the plug 15 is a drain port 19, which is adapted to align with the bore 9 while one of the openings 18 aligns with the bore 10 in the drain nipple extension 8 when the plug 15 has been shifted to another position, namely that shown in Figure 2 of the drawing so that liquid will pass from the bore in the nipple extension 7 into the bore 10 in the drain nipple extension 8 for the draining of the liquid through the nipple or spout 12 as will be obvious.

Now when the plug 15 has been shifted to another adjusted position, namely that shown in Figure 4 of the drawing the fluid will be interrupted or shutoff from the bore 9 in the nipple extension 7 to the bore 9 in the nipple extension 6, either for full flow of the liquid or the draining thereof through the cock as will be apparent.

The plug 15 in the lower open end thereof is internally threaded at 20 and in this threaded open end of said plug is adjustably engaged the screw end portion 21 of a retaining stem 22 having formed thereon a turning flange 23 supporting a washer 24 seated upon the bottom end of the housing or shell 5. The stem is locked in set position through the medium of an internally threaded packing gland collar or cap 25 which is adjustably threaded on to the lower end of the housing or shell 5. This collar or cap 25 has formed exteriorly thereon opposed finger knobs or lugs 26, which permit the screwing of the collar or cap on or from the externally threaded reduced lower end 27 of the housing or shell 5. Surrounding the reduced lower end 27 of the shell 5 and opposing the top edge of the cap 25 is a washer 29.

The stem 22 at its outer end carries a cross handle or grip 28, whereby the stem 22 can be turned. On the adjustment of the stem by the turning thereof in one direction it will draw the valve or plug 15 into the bore 13 in the housing or shell 5 to wedge the same therein and thus hold it in adjusted position. When the stem 22 is reversely turned it permits the loosening of the valve or plug 15 in the bore 13 in the housing or shell 5. The stem 22 coacting with the threads 20 provides for retaining the valve or plug 15 in the desired position. Adjustment of the valve or plug 15, for drainage or for opening or closing supply of liquid can only be had when it is loose.

By the assemblage of the stem 22 in the use of the collar or cap 25, the valve in the housing or shell 5 of the cock will be rendered leak-proof, as the cap or collar 25 can be screwed tightly onto the housing or shell 5, so that the flange 23 on the stem 22 will act upon the washer 24 which is seated against the body or shell to compress the washer and close the joint between the stem and the housing or shell 5 of the cock.

It is thought that the construction and manner of operation of the cock hereinbefore described will be clearly understood and therefore a more extended explanation has been omitted. It is of course to be understood that such changes, variations and modifications may be made in the cock as come properly within the scope of the appended claims, without departing from the spirit of the invention or sacrificing any of its advantages.

What is claimed is:—

1. In a cock for the purpose set forth a housing providing a valve chamber open at each end, the wall of said chamber having an inwardly tapered upper portion and a straight lower portion of uniform diameter, a pair of oppositely disposed, lengthwise aligning nipple extensions integral with the opposite sides of said housing and communicating with the tapered portion of said chamber, a drain extension integral with the outer face of said housing, disposed at right angles to said extensions and opening in the tapered portion of said chamber, a hollow valve mounted in and corresponding in shape to said chamber, said valve projecting above the upper end of the chamber, a winged head for the upper end of said valve, said valve formed with a pair of diametrically opposed openings for establishing communication between the interior of the valve and said nipple extensions when the valve is in one position, said valve further having an opening selectively registering with the nipple extensions for establishing communication between a nipple extension and said drain extension when the valve is in another position, flanged means extending into said housing and threadedly engaging with the interior of said valve for loosening or tightening the latter with respect to the wall of said chamber, and means for rendering said flanged means leak-proof at the lower end of the housing.

2. In a cock for the purpose set forth a housing providing a valve chamber open at each end, the wall of said chamber having an inwardly tapered upper portion and a straight lower portion of uniform diameter, a pair of oppositely disposed, lengthwise aligning nipple extensions integral with opposite sides of said housing and communicating with the tapered portion of said chamber, a drain extension integral with the outer face of said housing, disposed at right angles to said extensions and opening in the tapered portion, a hollow valve mounted in and corresponding in shape to said chamber, said valve projecting above the upper end of the chamber, a winged head for the outer end of said valve, said valve formed with a pair of diametrically opposed openings for establishing communication between the interior of the valve and said nipple extensions when the valve is in one position, said valve further having an opening selectively registering with the nipple extensions for establishing communication between a nipple extension and said drain extension when the valve is in another position, flanged means extending into said housing and threadedly engaging with the interior of said valve for loosening or tightening the latter with respect to the wall of said chamber, and means surrounding said flanged means and threadedly engaging with the lower end of the housing for locking said flanged means in set position.

In testimony whereof, I affix my signature hereto.

HERBERT F. DYCK.